United States Patent [19]

Buix et al.

[11] 3,976,208

[45] Aug. 24, 1976

[54] APPARATUS FOR PROVIDING ENDLESS SUCCESSION OF COMPARTMENTED TRAYS

[75] Inventors: Louis F. Buix, Crystal Lake; Harry J. Gribnitz, Addison; Gary A. Hohner, Sleepy Hollow, all of Ill.

[73] Assignee: The Quaker Oats Company, Chicago, Ill.

[22] Filed: Feb. 3, 1975

[21] Appl. No.: 546,609

[52] U.S. Cl. .............................. 214/6 H; 214/6 TS; 214/306
[51] Int. Cl.² ........................................ B65G 60/00
[58] Field of Search ................. 214/6 H, 6 P, 6 TS, 214/6 BA, 306

[56] References Cited
UNITED STATES PATENTS

| | | |
|---|---|---|
| 3,412,874 | 11/1968 | Shiffer .............................. 214/6 A |
| 3,448,867 | 6/1969 | Raynor et al. ......................... 214/6 P |
| 3,571,866 | 3/1971 | Brown ............................. 214/6 A X |
| 3,625,384 | 12/1971 | Boerger et al. ...................... 214/306 |
| 3,770,143 | 11/1973 | Breitbach ...................... 214/6 TS X |
| 3,776,395 | 12/1973 | Lingg et al. ...................... 214/6 P X |
| 3,854,602 | 12/1974 | Blank .............................. 214/6 BA |

*Primary Examiner*—L. J. Paperner
*Attorney, Agent, or Firm*—Charles J. Hunter

[57] ABSTRACT

An apparatus is disclosed for providing an endless succession of compartmented trays for holding pouches or the like to be processed. The apparatus has a first conveyor to provide a plurality of compartmented trays end on end in endless fashion; means for taking the trays off of the end of the conveyor and stacking them; means for destacking the trays and placing them on a second conveyor; and means for changing the trays from the second conveyor to the first conveyor to provide an endless succession of trays thereon.

1 Claim, 2 Drawing Figures

APPARATUS FOR PROVIDING ENDLESS SUCCESSION OF COMPARTMENTED TRAYS

BACKGROUND OF THE INVENTION

1. FIELD OF THE INVENTION:

This invention relates to an apparatus for providing an endless succession of compartmented trays to receive pouches or the like to be processed.

2. DESCRIPTION OF THE PRIOR ART:

In recent years the industry relating to sterilization of products has discovered that products may be placed in air and light impermeable pouches and sealed and sterilized within the pouches without the need to resort to the use of cans or other such containers. In providing these pouches to the sterilization equipment, many methods have been devised including manual stacking onto trays, clamping, putting in slots, and other such devices to move the pouches. To date, no one has provided a stackable tray which is compartmented and can be placed end on end to provide an endless succession of compartments while receiving the pouches, whereupon the trays are then stacked and placed in the sterilization equipment and thereafter returned to the depositing equipment in as endless succession of compartments. This invention satisfies the need for such a device.

SUMMARY OF THE INVENTION

It is an object of this invention to provide an apparatus for providing an endless succession of compartments of a compartmented tray for receiving a pouch or the like and stacking the trays to pass to a sterilization unit or the like.

The objects of this invention are accomplished by an apparatus for providing an endless succession of compartmented trays for holding pouches to be processed, said apparatus comprising: a first conveyor for moving a plurality of compartmented trays end on end in endless fashion; means for moving the first conveyor in a first direction; a second conveyor for receiving empty trays and returning them end on end in endless fashion to the first conveyor; means for moving the second conveyor in a direction opposite to the direction of movement of the first conveyor; and means for transferring the compartmented trays from the second conveyor to the first conveyor.

The objects of this invention are further accomplished by the above apparatus wherein the compartmented trays are removed from the first conveyor by means for stacking trays and wherein the trays are supplied to the second conveyor by means for destacking trays.

The objects of this invention are additionally accomplished by an apparatus for providing an endless succession of stackable, compartmented trays for holding items to be processed, said apparatus comprising: a first conveyor having a first end and a second end, and means for moving the first conveyor in a first direction; means for directing compartmented trays end on end onto the first end of the first conveyor; an elevator at the second end of the first conveyor; means for detecting trays leaving the second end of the first conveyor; and causing the trays to be stacked one on the other; means for destacking the trays and placing them on a second conveyor; means for moving the second conveyor at a rate such that the rate of trays leaving the second conveyor is at least equal to the rate of trays leaving the first conveyor; and means for moving the trays on the second conveyor to the means for directing compartmented trays end on end onto the first end of the first conveyor.

More specifically, in a preferred embodiment of this invention a single tray consists of a generally rectangular unit having compartments therein which may simply be looped dividers on a base with side walls extending upward therefrom with the base and upper side walls forming a stackable feature whereby one tray may be stacked on the other. The trays are placed on a conveyor end on end such that it gives the appearance and function of an endless unit of compartments one following the other in succession. The trays move down the conveyor where a device can deposite the pouches or the like thereon and then move to the end of the conveyor to a stacking mechanism. In the preferred embodiment of this invention the stacking mechanism is simply an elevator or some such device which senses a tray moving fully onto the elevator, then lowers the elevator so that the next succeeding tray can slide onto the top of the preceeding tray and stack thereon with particular emphasis given to the stacking feature of the trays which makes possible the stacking of the trays by sliding one onto the other. The stacked trays are then passed into a sterilization device and when removed are destacked and placed on a second conveyor. The destacking, again, may by by some pushing mechanism pushing the trays so that they slide off of and destack from an elevator or some other such device. Either during the destacking operation or while on the second conveyor, the sterilized pouches may be removed from the compartments in the trays. The trays then move on the second conveyor to a point adjacent to the feed end of the first conveyor whereupon they are transferred to the first conveyor in an end on end fashion to provide an endless succession of compartments on the trays thereon. Of particular importance is the use of a sensing device to detect the trays moving off the second conveyor and elevate them to activate a second sensing device which actuates a pusher to push the trays in endless succession onto the first conveyor.

BRIEF DESCRIPTION OF THE DRAWINGS

This invention may be more fully described but is not limited by the attached drawings wherein.

DESCRIPTION OF THE PREFERRED EMBODIMENTS

The attached drawings illustrate the preferred embodiments of this invention.

Figure 1:
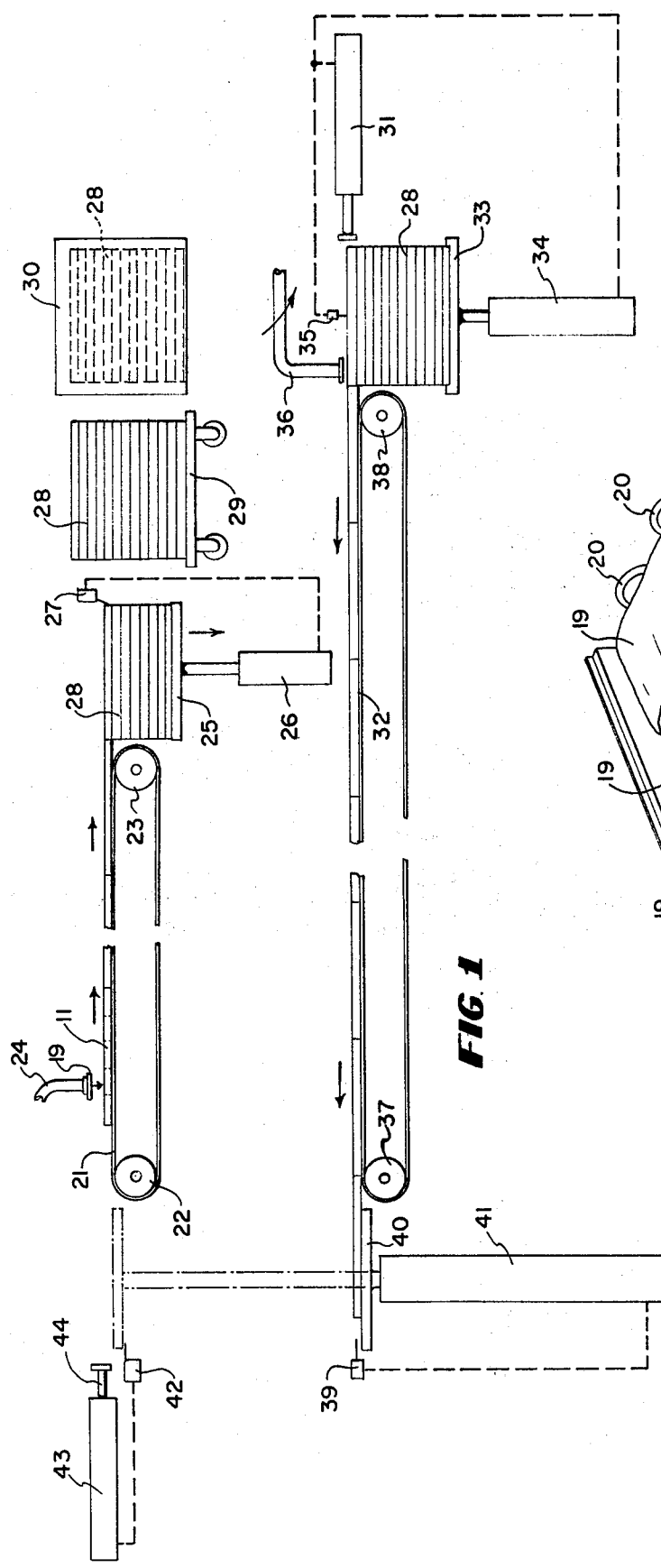
FIG. 1 illustrates a side view of the apparatus of this invention.
Figure 2:
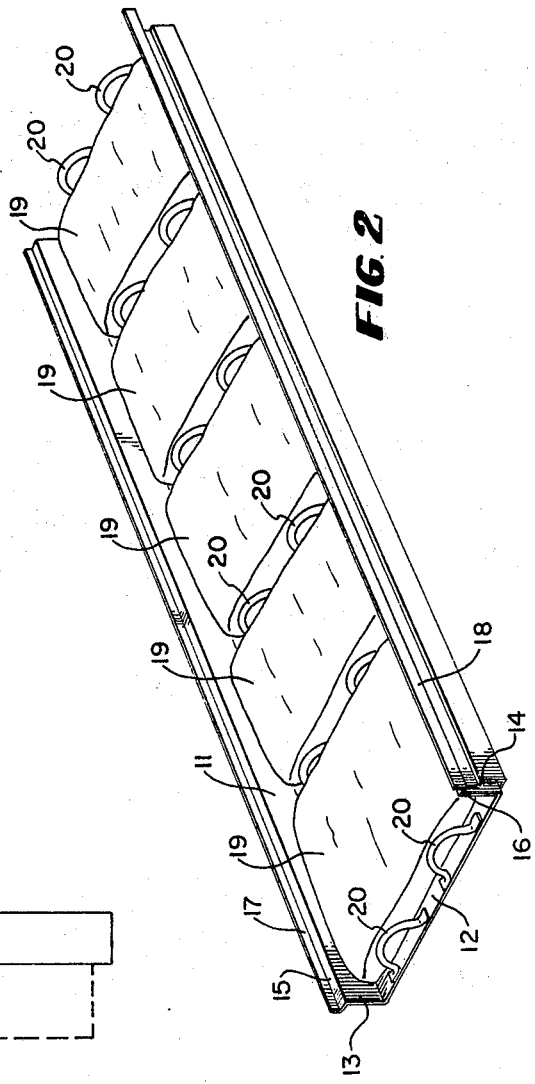
FIG. 2 illustrates a perspective view of a tray of preferred use in this invention.

In the drawings, and especially in FIG. 2, the numeral 11 is used to illustrate the tray of this invention. The tray has a base 12 which is generally rectangular and has upward side walls 13 and 14 terminating in a stackable design such as outward extensions 15 and 16 and upward arms 17 and 18. The trays have a series of compartments filled by pouches 19 which compartments in this case are provided by the divisions provided by loops 20. Referring now to FIG. 1, a first conveyor 21 moving over wheels 22 and 23 driven by appropriate driving devices, not shown, is appropriately designed to accept trays 11. As trays move down the conveyor, pouch 19 is deposited into the compartments on the trays by some such device as a vacuum line 24 releasing a vacuum which holds the pouch as the pouch passes over the compartment. The trays are moving on the conveyor end on end to present an endless row of continuous compartments thereon. As the trays move off of the conveyor they pass onto a platform 25 which can be raised or lowered by any such device such as piston 26. As the first tray moves onto the platform, it contacts a first sensing device 27 which causes the piston to lower the platform so that the next succeeding tray can slide onto the top of the first tray to present a stack of trays 28.

The stack of trays, when reaching an appropriate height, then slide off of the platform onto a cart 29 or the like and moved into a sterilization device or some other such processing equipment. After removal from the sterilization device, the stack of trays can then be put on another platform, although they may be destacked by other methods, and a piston 31 can take each tray and push it onto a second conveyor 32, by platform 33 and piston 34 being appropriately connected to a second sensing device 35, to effect appropriate destacking of the trays. At any time from this point on, the product may be removed from the compartments of the trays by any recognized method such as a vacuum pick-off device 36. The second conveyor moving over wheels 37 and 38 moves at a speed sufficient to return a sufficient number of trays to present an endless feed of trays to the first conveyor and thereby present an endless succession of compartments thereon. As the trays get to the end of the second conveyor, an appropriate third sensing device 39 is actuated thereby causing the platform 40 and piston 41 to be moved upward to a line on the plane of the first conveyor. At this point the arrival of the tray actuates a fourth sensing device 42 actuating piston 43 and plunger 44 causing the tray to move onto the first conveyor in an endless succession.

In operation, the apparatus operates as hereinbefore discussed with the trays making a continuous round and being delayed only for such time as is necessary for sterilization. The sterilization process may be either batch or continuous operation if that is desired.

It may thus be seen that this invention provides a new and novel apparatus for providing an endless succession of compartmented trays to a device which places pouches therein for later processing of the material in the pouch. This new and novel invention may be fully automated and provides a degree of certainty and speed heretofore unknown. It may thus be seen that this invention is new and unique and far superior than anything heretofore known.

Having fully described this new and unique invention, the following is claimed:

1. An apparatus for providing an endless succession of stackable, compartmented trays for holding items to be processed, said apparatus comprising: a first conveyor for moving a plurality of trays, said first conveyor having a first end and a second end; means for moving the first conveyor in a first direction; means for depositing articles in said trays; means for stacking trays received from said first conveyor; first sensing means operable to lower said stacking means a predetermined distance; means for destacking the trays; means for transferring the stacked trays to said destacking means; means for removing items from said trays; a second conveyor located below said first conveyor for receiving empty trays from said destacking means; a second sensing means operable to raise said destacking means a predetermined distance so that said trays can be received by said second conveyor; means for moving the second conveyor in a direction opposite to the direction of movement of the first conveyor and at a rate such that the rate of trays leaving the second conveyor is at least equal to the rate of trays leaving the first conveyor; means for directing said compartmented trays end on end onto the first end of the first conveyor; transfer means for moving the trays on the second conveyor to the means for directing compartmented trays end on end onto the first end of the first conveyor; a third sensing means operable to raise said transfer means a predetermined distance.

* * * * *